US009201668B2

(12) United States Patent
Beckert et al.

(10) Patent No.: US 9,201,668 B2
(45) Date of Patent: Dec. 1, 2015

(54) PROVIDING CONTENT ON CONNECTED DEVICES

(75) Inventors: Joerg Beckert, San Francisco, CA (US); Tuomas Dahlgren, Espoo (FI); Jani Leppanen, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1816 days.

(21) Appl. No.: 12/365,138

(22) Filed: Feb. 3, 2009

(65) Prior Publication Data

US 2013/0166423 A1    Jun. 27, 2013

Related U.S. Application Data

(60) Provisional application No. 61/096,286, filed on Sep. 11, 2008.

(51) Int. Cl.
*G06F 9/445* (2006.01)
*G06Q 30/04* (2012.01)

(52) U.S. Cl.
CPC ............... *G06F 9/445* (2013.01); *G06Q 30/04* (2013.01)

(58) Field of Classification Search
None
See application file for complete search history.

(56) References Cited

U.S. PATENT DOCUMENTS 5,963,916 A * 10/1999 Kaplan .................. 705/7.29
7,706,782 B1   4/2010 Hosmer et al.
2007/0067297 A1 * 3/2007 Kublickis .................. 707/9

OTHER PUBLICATIONS

U.S. Appl. No. 10/791,298, filed Mar. 1, 2004, James T. Morris, et al.
U.S. Appl. No. 10/791,311, filed Mar. 1, 2004, Dwight Ridgers, et al..
Open Mobile Alliance, "Software Component Management Object Requirements—Open Mobile Alliance," Candidate Version 1.0, Sep. 18, 2007, 22 pages.
Ortiz, "Introduction to OTA Application Provisioning," Sun Microsystems, Nov. 2002, 9 pages.

* cited by examiner

*Primary Examiner* — Ryan Zeender
*Assistant Examiner* — H Rojas
(74) *Attorney, Agent, or Firm* — Wolfe-SBMC (57) ABSTRACT

Among other disclosures, a method can include executing instructions on a computing platform so that an application and consumable content rendered by the application are provided to a connected device, executing instructions on the computing platform so that a confirmation is obtained that the application and consumable content were received by the connected device and the application was successfully installed by the connected device, and executing instructions on the computing platform so that a content delivery relationship, including a billing relationship, is established in response to the obtained confirmation.

25 Claims, 7 Drawing Sheets

PROVIDING CONTENT ON CONNECTED DEVICES

BACKGROUND

The present disclosure relates to providing content on connected devices.

Connected devices, including consumer electronic devices such as set-top boxes (STBs), handheld computers, personal digital assistants (PDAs), enterprise digital assistants (EDAs), smartphones, and mobile phones, are widely used. Connected devices can include an operating system, a user interface, applications and network connectivity. Operating systems (e.g., Symbian® OS™, Linux and Windows® Mobile®) can manage device hardware and provide an environment in which applications can execute. A user interface can include input and output apparatus, e.g., a display screen with touch input or a miniature keyboard, as well as graphics displayed by the device. Applications executing in an operating system or other application platform (e.g., Java™ Platform, Micro Edition (Java™ ME)) can provide a user the ability to access device functionality and perform tasks. Network connectivity can be wireless and provide access to, e.g., the Internet and Short Message Service (SMS). A user can utilize a connected device to consume (e.g., read or watch) a variety of content, such as news, weather updates and company stock information.

SUMMARY

This specification describes technologies relating to providing content on connected devices.

In general, one aspect of the subject matter described in this specification can be embodied in a method, implemented by a computer programmed to provide content on connected devices, which includes providing an application and consumable content rendered by the application to a connected device; obtaining confirmation the application and consumable content were received by the connected device and the application was successfully installed by the connected device; and establishing a content delivery relationship, including a billing relationship, in response to the obtained confirmation.

These and other embodiments can optionally include one or more of the following features. The method can further include receiving, from the connected device, a request, including one or more terms, to establish the content delivery relationship; and determining, based on the one or more terms, to provide the application and the consumable content to the connected device. The received one or more terms can include a price term. Determining can include comparing the price term to a corresponding stored price. The provided application can include a binary SWF-format object. Providing the consumable content can include transmitting binary encoded data using hypertext transfer protocol. Establishing the content delivery relationship can include periodically supplying one or more data updates. Establishing the content delivery relationship can include charging a user of the connected device based on the one or more terms.

Particular embodiments of the invention can be implemented to realize one or more of the following advantages. If information about subscribing to content on a client is out-of-date or inaccurate, an attempted subscription can fail. Thus, a connected-device user can be assured that a content subscription is according to known terms. A server's information regarding a client's state can be updated accurately based on confirmation from the client. Thus, a connected-device user can be billed for a content subscription when content is successfully accessed and installed rather than merely after the content is sent to the client. For example, if insufficient space is available on a connected device to install content, a user can be informed and abandon the subscription request, e.g., before costs are incurred. Similarly, the user can be informed of the space requirement allowing the user to free up sufficient space to install the content. In addition, technical support can be more effective since a server can have more information regarding client states and the points at which problems are encountered. Similarly, billing administration can be more efficient and less expensive when fewer complaints from connected-device users are received due to charges being incurred for content not successfully accessed.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 1:
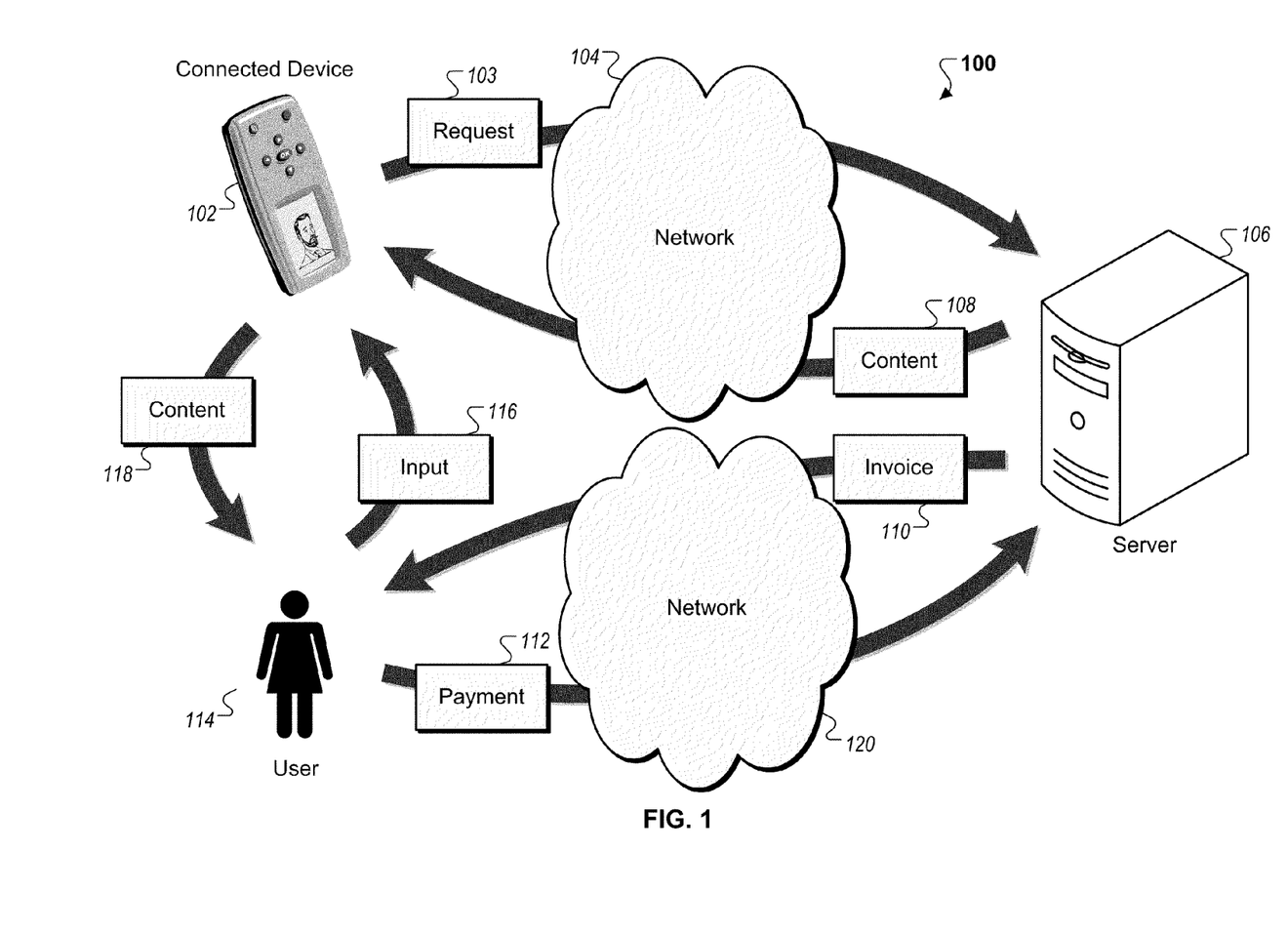
FIG. 1 is an overview diagram showing provision of content on connected devices.

FIG. 1 is an overview diagram (100) showing provision of content on connected devices. In general, a user of a connected device can consume content on a connected device. Consuming content can include, e.g., reading information, viewing pictures, playing games, or watching videos. The connected device can receive the content as part of a subscription over a wireless network from a server. The user can be charged for the subscription.

A connected device (102) is a consumer electronic device configured to connect to a network (e.g., the Internet). The connected device (102) can be a handheld computer, PDA, EDA, STB, smartphone, or mobile phone. The connected device (102) can include an operating system, a user interface, applications and network connectivity.

A network (104) can be a radio network made up of a number of cells. The cells can be served by fixed transmitters. The network (104) can enable users to make voice calls using a connected device (102). The network (104) also can support SMS and email messages sent from the connected device (102). The network (104) also can support communication protocols such as Hypertext Transfer Protocol (HTTP) and can provide an interconnection between networks (e.g., receiving an HTTP message through a cell network and delivering the message via the Internet).

A network (120) can be an interconnection between network hosts (e.g., computers and devices). The network (120) can allow hosts to communicate with each other and share resources and information. The network (120) can be, for example, a local area network (LAN) or wide area network (WAN). A LAN can cover a small geographic area, like a home, office, or building. LANs can be based on Ethernet technology and operate in a wired or wireless configuration. The network (120) can represent the Internet or other internetwork. The network (104) and the network (120) also can be the same network.

A server (106) is configured to provide content to a connected device (e.g., the connected device (102)). The server (106) can include mechanisms for receiving requests for content subscriptions and transmitting content to subscribed users. The server (106) can be one or more applications running on one or more computer systems. The server (106) can be an Adobe Mobile Server provided by Adobe Systems Incorporated of San Jose, Calif.

A user (114) can be an individual having a connected device (102). The user (114) can use the connected device (102) for receiving content, among other purposes.

In operation, the user (114) can enter input (116) into a connected device (102). The input (116) can be commands entered through a user interface on the connected device (102). The commands can be to subscribe to content available on the connected device (102). An application on the connected device (102) can submit a request (103) to a server (106) through a network (104). The request (103) can, e.g., be an HTTP POST message. The request (103) can include data in a body of the message. The request (103) can be a subscribe request. The server (106) can validate the request (e.g., determining the user is subscribed or that a subscription request is valid) and respond to the request (103). The server can transmit content (108) back to the connected device (102). The content (108) can include data, binary data, and applications for displaying and interacting with the data. The content (108) can be binary encoded and machine readable. The content (108) can be sent in an HTTP or SMS message. The connected device (102) can include a client application configured to receive, decode, execute and display the content (108). The client application can be a client runtime for hosting and managing the presentation of data services and data-enabled user interfaces such as Adobe Mobile Client provided by Adobe Systems Incorporated of San Jose, Calif. On the connected device (102), the content (118) can be provided for consumption by a user 114 in a form accessible to the user (114) (e.g., a user interface including text and graphics that can be understood by the user (114)). The content (118) can include, e.g., news stories, weather information, or stock quotes.

The server (106) can monitor a user's subscription. When a user (114) has successfully subscribed to content (e.g., by downloading and successfully installing the content), the server (106) can send an invoice (110) to the user (114) through the network (120). In response, the user (114) can submit payment (112). The server (106) can receive indication of the payment (112) and continue providing content (108) to the connected device (102).

FIG. 2 is an example of a system (200) for providing content on connected devices. In general, connected devices can submit requests for content, such as by subscribing to specific content. In response, connected devices can receive content. A system for providing content can manage billing, content and subscription information.

Figure 2A:
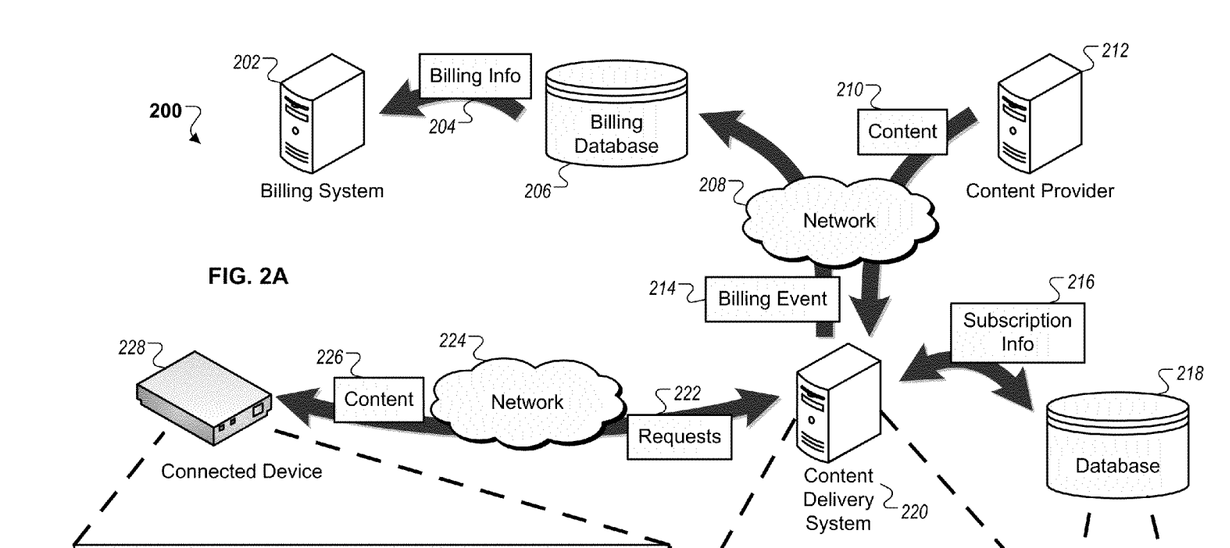
FIG. 2A is an example of a system for providing content on connected devices.

A connected device (228)) is a consumer electronic device configured to connect to a network (e.g., the Internet). The connected device (228) can be a STB (or set-top unit (STU)), handheld computer, PDA, EDA, smartphone, or mobile phone. The connected device (228) can include an operating system (230), a user interface, applications and network connectivity. A user interface can include input and output apparatus, e.g., a display screen with touch input or a miniature keyboard, as well as graphics displayed by the device. Network connectivity can be wireless and can provide access to, e.g., the Internet and SMS.

A network (224) can be a radio network made up of a number of cells. The cells can be served by fixed transmitters. The network (224) can enable users to make voice calls using a connected device (228). The network (224) also can support SMS and email messages sent from the connected device (228). The network (224) also can support communication protocols such as Hypertext Transfer Protocol (HTTP) and can provide an interconnection between networks (e.g., receiving an HTTP message through a cell network and delivering the message via the Internet).

A content delivery system (220) is configured to manage providing content to connected devices. The content delivery system (220) can be connected to other systems and devices and receive input and provide output. The content delivery system (220) can include computing hardware and an operating system configured to execute applications.

A database (218) is a repository for information. The database (218) can be, e.g., a structured collection of records or data that is stored in a computer system (e.g., the content delivery system (220)). The database (218) can be structured according to a database model (e.g., the relational, hierarchical, object or network model).

A content provider (212) is an entity that provides content. The content provider (212) can, for example, provide current news stories or financial information. The content provider (212) can either or both gather or generate content (e.g., a news-content provider can have journalists that write articles describing current events).

A billing database (206) is a database that can store information about charges incurred by users. The billing database (206) can be a repository of information used by a billing system (202) in generating bills for users. For example, if the billing database (206) includes information about charges incurred by a particular user, the billing system (202) can mail a bill requesting payment to the user.

Figure 2B:
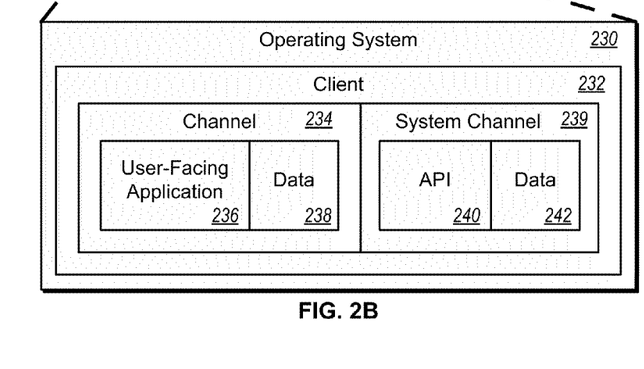
FIG. 2B is an expanded view of an example connected device.

FIG. 2B is an expanded view of an example connected device (228). On the connected device (228), applications can execute that provide a user the ability to access device functionality and perform tasks. The applications can be hosted by an operating system designed for connected devices (e.g., Symbian OS™, Linux and Windows® Mobile®) or other application platform (e.g., Adobe® AIR™, Adobe Flash® Cast™, and Java™ ME). The operating system (OS) (230) can include either or both of an operating system and application platform. The OS (230) can manage device resources (e.g., hardware, memory, software, and drivers). Hosting an application can include storing the application and application-related settings in an executable form, and executing the application (e.g., at startup or when requested by a user).

A client (232) is hosted by an operating system (e.g., the OS (230)). The client (232) can be an application executed by a user in the operating system and can allow a user to subscribe to various types of content. The client (232) can be a runtime (e.g., a virtual machine or application platform) and host other applications (e.g., managing the applications while they execute). The client (232) can be configured to execute on a wide range of connected devices and operating systems. The client (232) can manage the presentation of data services and data-enabled user interfaces. The client (232) can provide rich content (e.g., content including a combination of content forms such as text, audio, images, vector graphics, video, animation and interactive interfaces) to a user. The client (232) can cache information (e.g., applications and data such as a channel (234)) on a connected device and thus provide instantly-available access (e.g., without needing to first connect to a network). The client (232) can be Adobe Mobile Client provided by Adobe Systems Incorporated of San Jose, Calif.

The client (232) can implement client-specific aspects of a content-delivery protocol (e.g., the Mobile Content Delivery Protocol provided by Adobe Systems Incorporated of San Jose, Calif.). The client (232) can facilitate use of the connected device (228) resources through interaction with the OS (230) (e.g., to manage memory of the connected device (228) and to display information on a screen of the connected device (228)).

The channel (234) is hosted by the client (232). The channel (234) can include a user-facing application (236) configured to render data (238). The term "channel" can therefore refer to both or either of the user-facing application (236) and the associated data (238). Both can be part of providing the content associated with a channel subscription. In specific, the user-facing application (236) can render the data (238) for display to a user and provide an interface though which a user can interact with the channel (234). For example, the channel (234) can provide weather information. Through an interface of the user-facing application (236) a user can request to see the data (238), including temperature information for the user's geographic location.

A system channel (239) is also hosted by the client (232) and can include an application programming interface (API) (240) and data (242). The system channel (239) can allow a user to find out about and subscribe to new channels. In some implementations, a system channel can include a user-facing application, similar to the user-facing application (236), allowing a user to directly interact with the system channel. In other implementations, the system channel (239) can include an API (240) allowing other applications to perform functions and access the system channel (239) data (242).

Figure 2C:
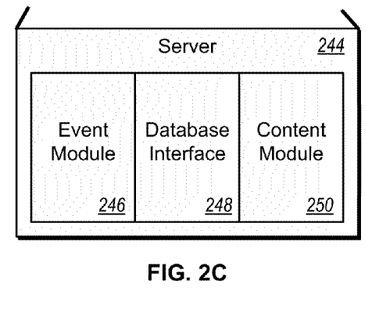
FIG. 2C is an expanded view of an example content delivery system.

FIG. 2C is an expanded view of an example content delivery system. A server (244) can be an application hosted by the content delivery system (220). The server (244) can implement server-specific aspects of a content delivery protocol (e.g., the Mobile Content Delivery Protocol). The server (244) can generate events in an event module (246) handled by the server (244) or transmitted to other systems (e.g., a billing database (206)). The server (244) also can store and retrieve information using a database (e.g., database (218)) through a database interface (248). Further, the server (244) can manage delivery of channels (e.g., data and applications for rendering the data) through a content module (250) and receipt of content (e.g., content (210)) from various content sources (e.g., content provider (212)).

Figure 2D:
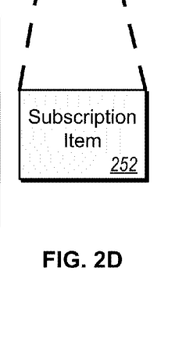
FIG. 2D is an expanded view of an example subscription database.

FIG. 2D is an expanded view of an example subscription database. For example, the database (218) can store information about a user subscription in a subscription item (252). The subscription item (252) can include information about a user (e.g., name and contact information) and the user's subscriptions (e.g., subscription identifiers and periods).

In operation, referring to FIGS. 2A-2D, the client (232) can manage receiving content (226) and producing requests (222). The user can discover the available content and subscribe to specific content (226) via the system channel (239). The system channel (239) can, via the client (232), generate requests (222) based on commands entered by the user. If a user is subscribed to a channel (234), the content delivery system (220) can provide content (226) to the connected device (228). The content (226) can be stored as data (238) on the client (232) and can be rendered by the user-facing application (236).

In order to provide content, the content delivery system (220) can include a server application (244) that manages content (e.g., through the content module (250)), subscription information (e.g., through the database interface (248)) and billing (e.g., through the event module (246)). The content module (250) of the content delivery system (220) can receive content (210) (e.g., news stories, weather information) from a content provider (212). The content delivery system (220) can manage user subscriptions, including storing subscription information (216) through the database interface (248) in a database (218) as a subscription item (252). With the subscription information (216), the content delivery system (220) can determine whether a particular user, e.g., should be given access to requested content. The content delivery system (220) also can generate a billing event (214) via the event module (246). The event (214) can be transmitted through the network (208) to a billing database (206). A billing system (202) can retrieve the billing information (204) from the billing database (206) and generate a bill for the user based on the user's subscriptions.

Figure 3:
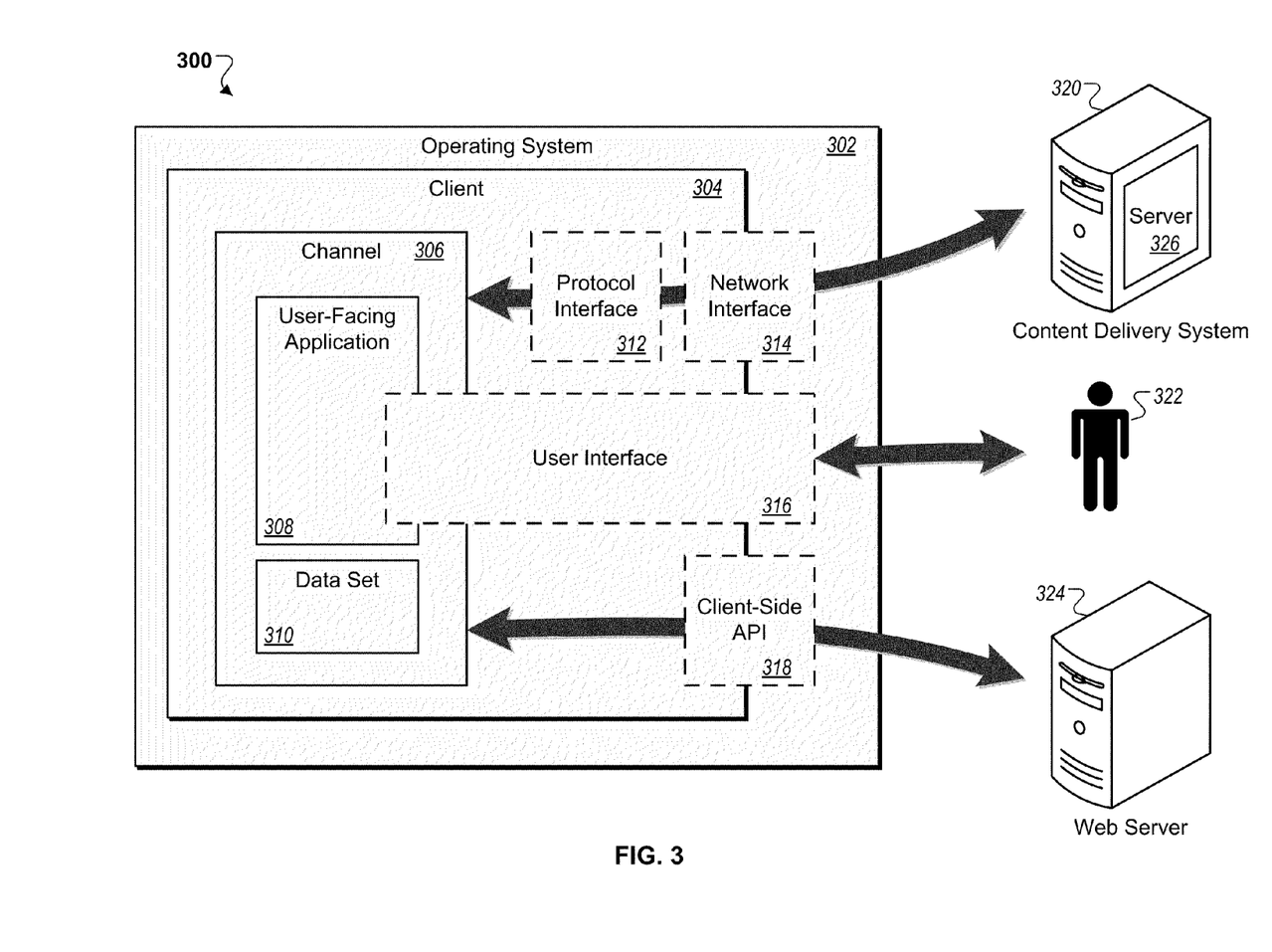
FIG. 3 is a diagram showing examples of interfaces available to an application hosted by a client.

FIG. 3 is a diagram (300) showing examples of interfaces available to an application (308) hosted by a client (304). In general, a channel (306) can include a user-facing application (308) and an associated data set (310). A channel application can interact with a content delivery system (320), a user (322) and other systems (e.g., a web server (324)) through interfaces.

The operating system (OS) (302) can be an infrastructure software component of a connected device. The OS (302) can be, e.g., Symbian OS™, Linux or Windows Mobile®. The OS (302) can be responsible for the management and coordination of activities and the sharing of a connected device's limited resources. The OS (302) can act as a host for applications that are running on the device (e.g., the client (304)). As a host, the OS (302) can be responsible for the operational details of the device's hardware (e.g., a radio signal transmitter).

The OS (302) can offer services to applications (e.g., the client (304)) and users (e.g., the user (322)). Applications can access the services through application programming interfaces (APIs) (e.g., a client-side API (318)) or system calls. Through APIs, applications can request a service from, pass parameters to, and receive the results of the operation of the OS (302). The OS (302) also can provide a user interface (e.g., a user interface (316)) to allow users to interact with the OS (302).

A content delivery system (320) can be a system for delivering subscription-based content. The content delivery system (320) can be one or more computer systems and operating systems configured to execute software and provide connectivity. For example, the content delivery system (320) can be configured to execute a server application (326) and provide connectivity (e.g., network connectivity) for the server application (326). The content delivery system (320) can be configured to provide administration features (e.g., an administrator interface, not shown).

A server (326) can be an application hosted by the content delivery system (320). The server (326) can implement server-specific aspects of a content delivery protocol (e.g., the Mobile Content Delivery Protocol). The server (326) can communicate with other systems, store and retrieve information, and manage the collection and delivery of content to users.

The user (322) can be a user having a connected device. The user (322) can consume content (e.g., reading text, watching video or listening to music). The user (322) can enter commands on a connected device to interact with the device.

The web server (324) can be one or more computers that execute a software application responsible for accepting Hypertext Transfer Protocol (HTTP) requests. The web server (324) also can serve (i.e., transmit) HTTP responses. The responses can potentially include data contents such as text (e.g., HyperText Markup Language (HTML) or Extensible Markup Language (XML)) or binary (e.g., image or application) files.

A client (304) is an application hosted by the OS (302). The client (304) can be an application executed by a user allowing the user to subscribe to various types of content. The client (304) can include a user interface (316). The client (304) can host applications (e.g., the user-facing application (308)) configured to display specific types of content. The client (304) also can host applications configured to provide services to other applications which in some implementations do not include user interfaces.

The client (304) can implement client-specific aspects of a content-delivery protocol. As part of implementing the protocol, the client (304) can facilitate communication (e.g., through the protocol interface (312) and network interface (314)) between hosted applications (e.g., the user-facing application (308)) and other systems implementing the protocol (e.g., the server (326) on the content delivery system (320)).

The channel (306) can be a user-facing application (308) and an associated data set (310). The channel (306) can be hosted by the OS (302). The channel (306) also can be subscribed to and updated periodically. The channel (306) can be cached by the client (304) on a connected device. Advantageously, caching can allow the channel (306) to startup (e.g., initiate execution) more quickly (e.g., instantaneously) in comparison to non-caching implementations. Relative to the client (304), the channel (306) can be small, thus facilitating a connected device downloading the channel (306). The channel (306) can render the data set (310).

The channel (306) can either be a system channel or a non-system channel. Non-system channels are also referred to as standard channels. Standard channels can define data object types, identifiers, and property names to represent their data. For example, a standard channel can display weather data to users. The channel can define a typed data object, or feed item, called "location." The data objects can be assigned an item identifier equal to a location's zip code (e.g., 92130). The data objects can include two properties named "highTemp" and "lowTemp."

A system channel can enable users to subscribe to a new channel or discover new channel content. System and non-system channels can be similar differing only in the types of data included and the permissions they have within the client (304). System channels may not have a user interface and can instead be controlled by a set of APIs accessible by other channels.

The user-facing application (308) can render the data set (310) for display and provide a user interface (316). The user-facing application (308) can be a binary file or object, e.g., in the SWF format. Files in the SWF format can have the extension ".swf." SWF files and objects can have a type defined in the Multipurpose Internet Mail Extensions (MIME) standard of "application/x-shockwave-flash." Although the MIME standard can apply to e-mail messages, MIME types can be used in protocols such as Hypertext Transfer Protocol (HTTP) for the World Wide Web. SWF objects can deliver vector graphics, text, video, and sound over the Internet. SWF objects are supported by Adobe® Flash® Player software provided by Adobe Systems Incorporated of San Jose, Calif.

The data set (310) can be a channel's content or a portion of the content. For example, the user-facing application (308) can receive a data set (310) from the content delivery system (320). The data set (310) can include weather information (e.g., temperatures and forecasts). The user-facing application (308) can include weather icons, such as a sun, cloud, and rain cloud, and display the icons based on the data set (310).

The client (304) can provide a protocol interface (312). The protocol interface (312) can allow the channel (306) to create and communicate messages consistent with a content delivery protocol. The protocol interface (312) can facilitate development of channels by making interaction via the content delivery protocol less cumbersome. The protocol interface (312) also can provide a sole communication path between a channel (306) hosted on the client (304) and a remote protocol server (e.g., the server (326)). Advantageously, not including protocol implementation details in a user-facing application (308), for example, can reduce both the size and complexity of the user-facing application (308).

A network interface (314) can receive communications and transmit them across a network. The OS (302) can implement portions of a network interface (314) and expose the functionality to the client (304), such as through an API. The client (304) can include methods or functions that make calls to the API, facilitating network communication. [0060] A user interface (316) can be configured to receive input from a user (322) and to display information to a user (322). The user interface (316) can be displayed on a connected device screen. The screen can be touch-sensitive, allowing a user (322) to interact with the user interface (316) through a single medium. The user interface (316) also can include buttons allowing a user (322) to navigate though graphical portions of the user interface (316) displayed on a screen.

The user interface (316) can be implemented in the OS (302). Therefore, the OS (302) can have a user interface (316) for interaction specific to the OS (302). In addition, the client (304) can include an implementation of a user interface (316). The client (304) can, for example, build on a framework provided by the OS (302). Furthermore, the user-facing application (308) can include implementation of a user interface (316) based on functionality made available by the client (304) and the OS (302). The final result can be a user interface (316) for the user-facing application (308) with various layers of implementation. The layers can be non-duplicative and build one upon the other. Advantageously, the user interface (316) implementation in the user-facing application (308) can be simplified and not require, for example, aspects for interacting with the client (304) or the OS (302).

The client-side application programming interface (API) (318) can provided access to functionality to applications executing in the OS (302). For example, the client-side API (318) can enable a user-facing application (308) to make calls to the web server (324). The client (304) can grant or deny permission to a user-facing application (308) to user a client-side API (318) based, e.g., on access privileges or user (322) settings.

In operation, a user (322) can interact through a user interface (316) with a client (304), hosted by an OS (302), on a connected device. The user (322) can view subscription options provided by a channel (306) (e.g., a catalog system channel). The subscription options can be included in a data set (310) displayed by a user-facing application (308). The user (322) can enter commands to subscribe to particular content. The user-facing application (308) can receive the commands from the user interface (316) and transmit the request through the protocol interface (312). The protocol interface (312) can create a request message conforming to a message delivery protocol. The protocol interface (312) can transmit the request message via a network (314) to a server (326) hosted on a content delivery system (320). The server (326) can evaluate the request and respond to the user's (322) request.

Figure 4:
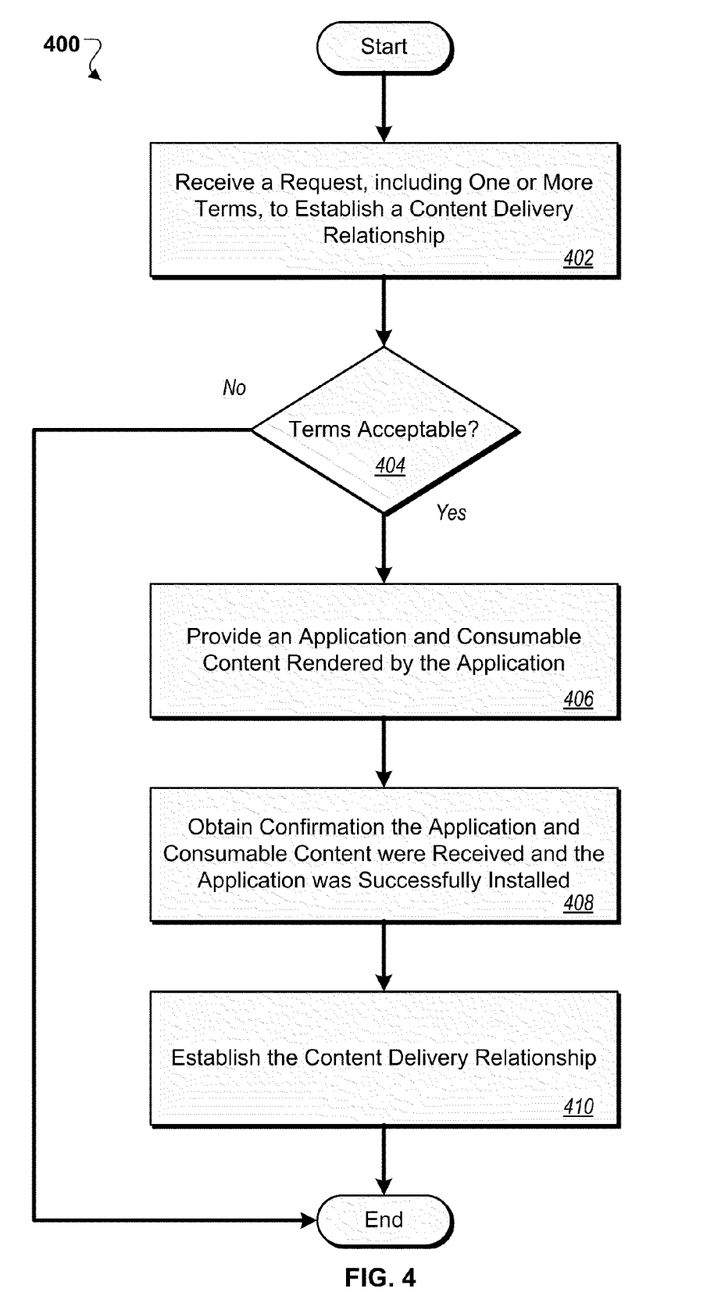
FIG. 4 is a flow chart showing an exemplary process for providing content on connected devices.

FIG. 4 is a flow chart showing an exemplary process (400) for providing content on connected devices. In some implementations, a request, including one or more terms, to establish a content delivery relationship can be received (402). The terms can be received as part of a request to subscribe submitted by a connected-device user via a connected-device client. It can be determined whether the terms are acceptable (404). Acceptable can include the terms being consistent with corresponding and known terms. If the terms are determined (404) to not be acceptable, further processing can end. For example, a client can submit a request to subscribe including a subscription period of twelve months. If the server, however, has information that the period for the content subscription is actually six months, the terms can be determined to be unacceptable. In another example, a client can have a catalog describing the available content subscriptions and associated prices. The catalog on the client can be out of date and display an incorrect price to the connected-device user. If the connected-device user then attempts to subscribe, the request to subscribe can include a price term that is inconsistent with the price stored by a server. Based on the inconsistency, the subscription can fail. Advantageously, the user can be informed about the failure rather than being successfully subscribed and charged a different amount than anticipated. In addition, the user can be informed of the new price (e.g., by receiving an updated catalog).

The terms also can be determined (404) to be acceptable. For example, determining the terms to be acceptable can include both received price and period terms being the same as price and period terms stored by a server. If the terms are determined (404) to be acceptable, an application and consumable content rendered by the application can be provided (406). For example, a server can transmit an HTTP POST response, including a binary encoded payload, to a connected client. The payload can include the application and the consumable content. Confirmation the application and data were received and the application was successfully installed can be obtained (408). The content delivery relationship, including a billing relationship, can be established (410).

Figure 5:
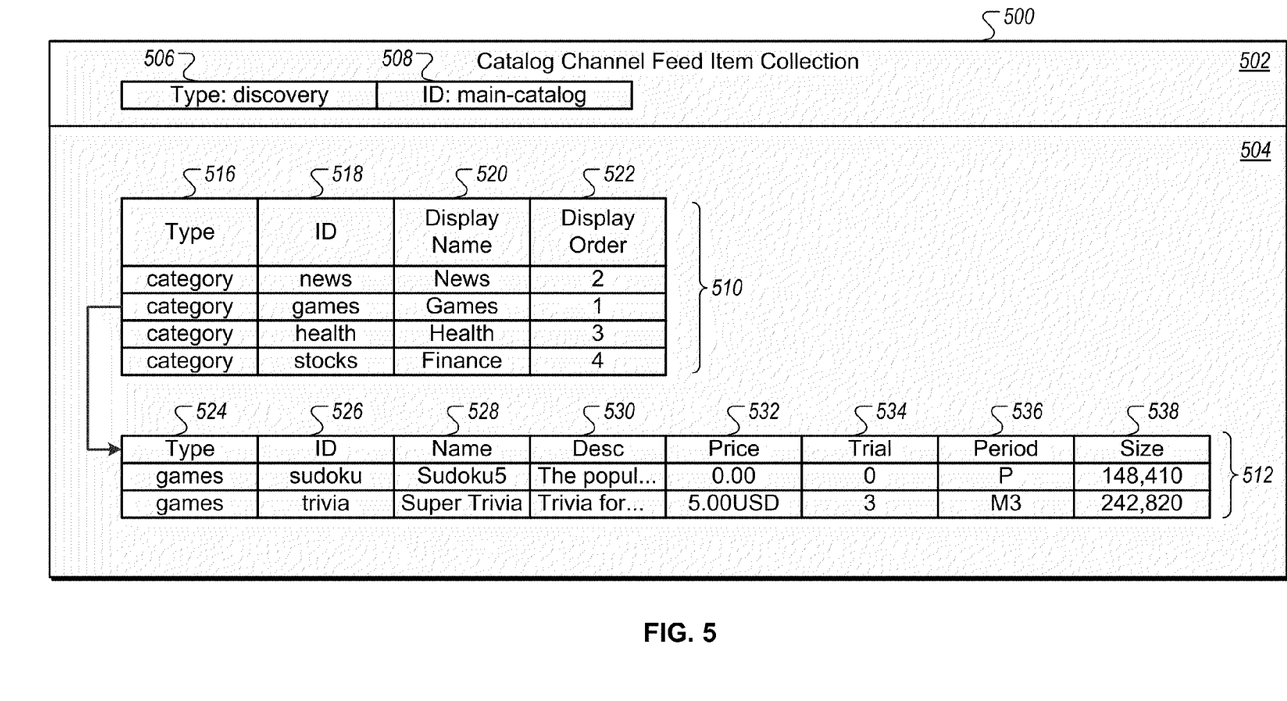
FIG. 5 is a diagram showing exemplary catalog channel data.

FIG. 5 is a diagram (500) showing exemplary catalog channel data. In general, a catalog channel can be a system channel designed to expose users to content available on the server. A content delivery system can have one or more catalog channels. A client can provide a user interface for users to browse catalog channel data and to make channel subscription requests. A client can be subscribed to zero or more catalog channels.

A catalog channel's data set, depicted in the diagram (500), can include channel-level data (502) and category-level data (504). The channel-level data (502) can include a content type (506) (e.g., "discovery") and an identifier (508) (e.g., "main-catalog"). The content type (506) can allow a client to selectively display catalog channels rather than other channel types. The identifier (ID) (508) can uniquely identify the catalog channel across channels.

The category-level data (504) can include information (510) about the categories of channels available and information (512) about a specific category. The information (510) about the categories available can include a type (516), ID (518), display name (520) and display order (522). The type (516) (e.g., "category") can indicate that a particular data item provides information about a category. The ID (518) can be a unique identifier for a given category, and allow category-specific information (512) to be correlated with the correct category. The display name (520) can be the name displayed to users relative to the category. The display order (522) can be the order in which categories should appear when displayed in a list.

The category-specific information (512) corresponds to channels available in a category (e.g., a category with an ID of "games"). The type (524) can correspond to the identifier (518) allowing many channels to correspond to a single category. The ID (526) can uniquely identify a channel across all channels in all categories. Thus, a channel can belong to more than one category and a many-to-many relationship can exist between channels and categories. The name (528) can be a channel name displayed to users. The description ("Desc") (530) can be a description of the channel that allows users to find out more about the content included in a channel. The price (532) can indicate how much a user will need to pay to subscribe to the channel. Some channels can be free and have no price (532) or a price (532) of zero. Other channels can have a non-zero price (532). The price (532) can include an indication of what currency the amount is in (e.g., "USD" for United States Dollars, or "EUR" for Euros). The trial indication (534) can be the number of days a user can subscribe to a channel on a trial basis. The period (536) can indicate how long a channel subscription will run. For a more detailed description of possible values for the period (536), see FIG. 7 below. The size (538) can be the amount of storage needed on a connected device to subscribe to the channel (e.g., to install the channel's user-facing application or download the content). Prior to make a subscription request, a client can use the size (538) to verify that the channel will fit on the connected device. If insufficient space is available, advantageously, the client can abandon the subscription request, e.g., before costs are incurred. The size (538) also can, e.g., provide a user with information about how much space a channel will take up on a connected device and how much space needs to be freed to install a channel.

Figure 6:
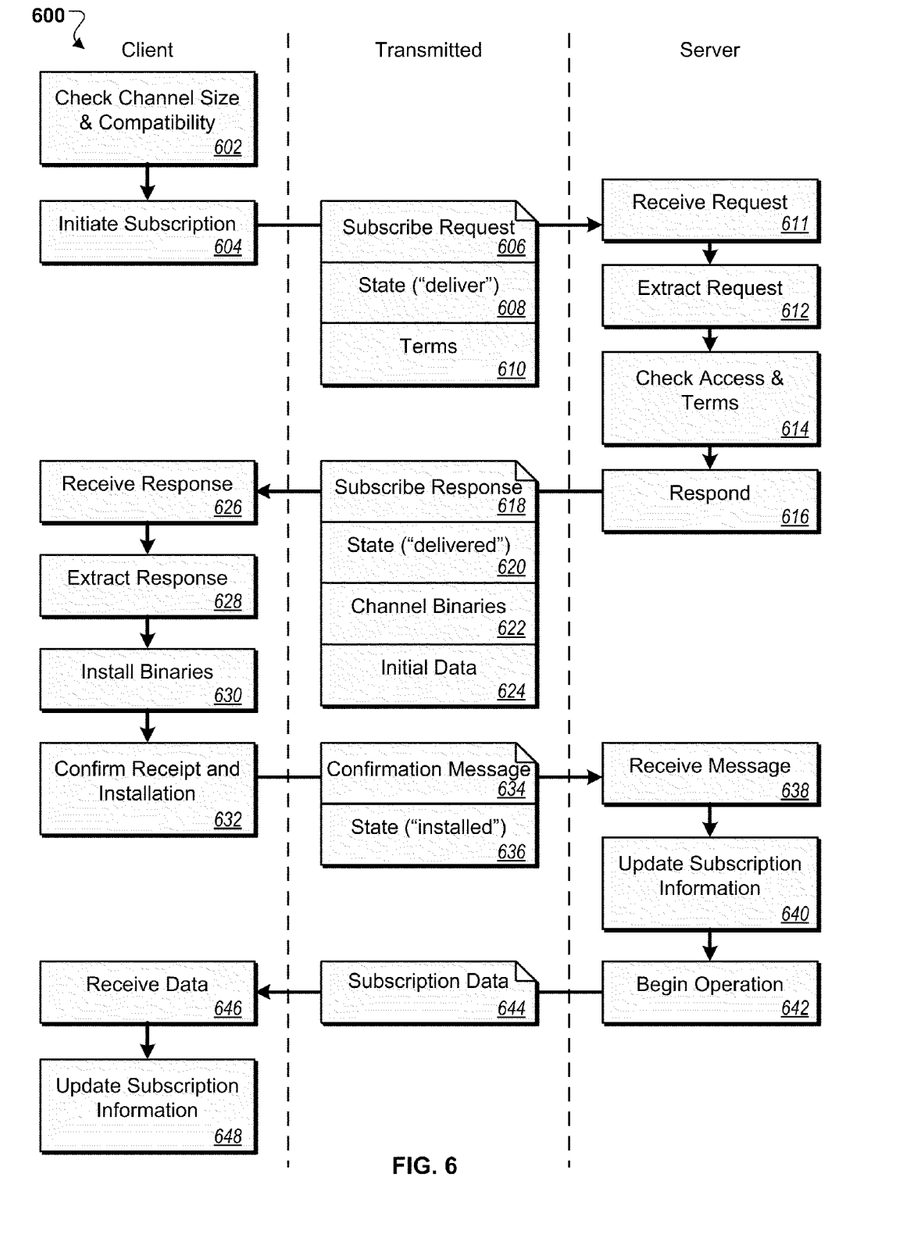
FIG. 6 is a flow diagram showing an exemplary subscription process.

FIG. 6 is a flow diagram showing an exemplary subscription process (600). In general, a client (e.g., an application on a connected device) can initiate a channel subscription request. A server (e.g., an application configured to provide content) can receive the subscription request and monitor the subscription process to ensure the client can successfully receive the channel content.

The process (600) can initiate on the client by checking (602) the channel size and compatibility. For example, channel size information can be received from a catalog channel and be used to verify sufficient storage space to install the binaries (e.g., an application) associated with the channel. In addition, compatibility can be checked. For example, an application associated with a channel may not be compatible with the client (e.g., the client cannot host an SWF object of a particular version).

Upon determining sufficient storage space exists and a channel is compatible with a client, the process (600) initiates (604) a subscription. Initiating a subscription can include transmitting a subscribe request (606) to a server. The subscribe request (606) can include information about the channel to which the client is requesting subscription and a user's access privileges. The subscribe request (606) also can include a state indication (608) (e.g., "deliver"). For a more detailed description of states used in some implementations, refer to the description of FIG. 7 below. The state indication (608) can communicate to the server that the client is requesting to receive a channel (e.g., a user-facing application and data set). The subscribe request (606) also can include terms (610). The terms (610) can include, e.g., a price for a subscription period.

The process (600) receives (611) the request (606). The process (600) extracts (612) the request (606) sent by the client. The request (606) can, e.g., be binary encoded and extracted to a form used by the server. The process (600) checks (614) the access information included with the subscribe request (606) and terms (610). If, for example, a price term included in the terms (610) is lower than the price stored by the server, the server can decline to honor the subscribe request (606) (e.g., a catalog stored by a client includes an out-of-date price).

Assuming the terms (610) are acceptable, the process (600) responds (616) to the request (606). The subscribe response (618) can be transmitted to the client. The subscribe response (618) can include a state indication (620) (e.g., "delivered"). The state indication (620) can communicate to the client that the response includes the channel binaries (622) and initial data (624). The channel binaries (622) can be one or more applications used for rendering the channel data including the initial data (624). The initial data (624) can be the content associated with a channel (e.g., news information).

The process (600) can receive (626) the response (618) at the client. The process (600) can extract (628) the response. The process (600) can install (630) the binaries (622) received from the server. The installation can fail for a variety of reasons (e.g., an unforeseen incompatibility). If, however, the installation is successful, the process (600) can confirm (632) receipt and installation of the binaries (622). A confirmation message (634) can be transmitted from the client to the server. The confirmation message (634) can include a state indication (636) (e.g., "installed"). The station indication (636) can communicate to the server that the client received the binaries (622) and was able to successfully install them.

The process (600) can receive (638) the confirmation message (634). The process (600) can update (640) subscription information for the user stored by the server. For example, the server can update a state indication (e.g., "activated") for the user. The process (600) can begin operation (642) of the channel subscription. The operation can include transmitting subscription data (644) to the client. The subscription data (644) can be a confirmation by the server to the client. The subscription data (644) also can be a channel update (e.g., including new data for the channel).

The process (600) can receive (646) the data (644). Based on the subscription data (644), the process can update (648) the subscription information. At this point, the client and the server can both be in the same state indicating that the subscription was successful and is active. Based on the process (600), the client and server can be ensured of storing the correct state and being synchronized.

Figure 7:
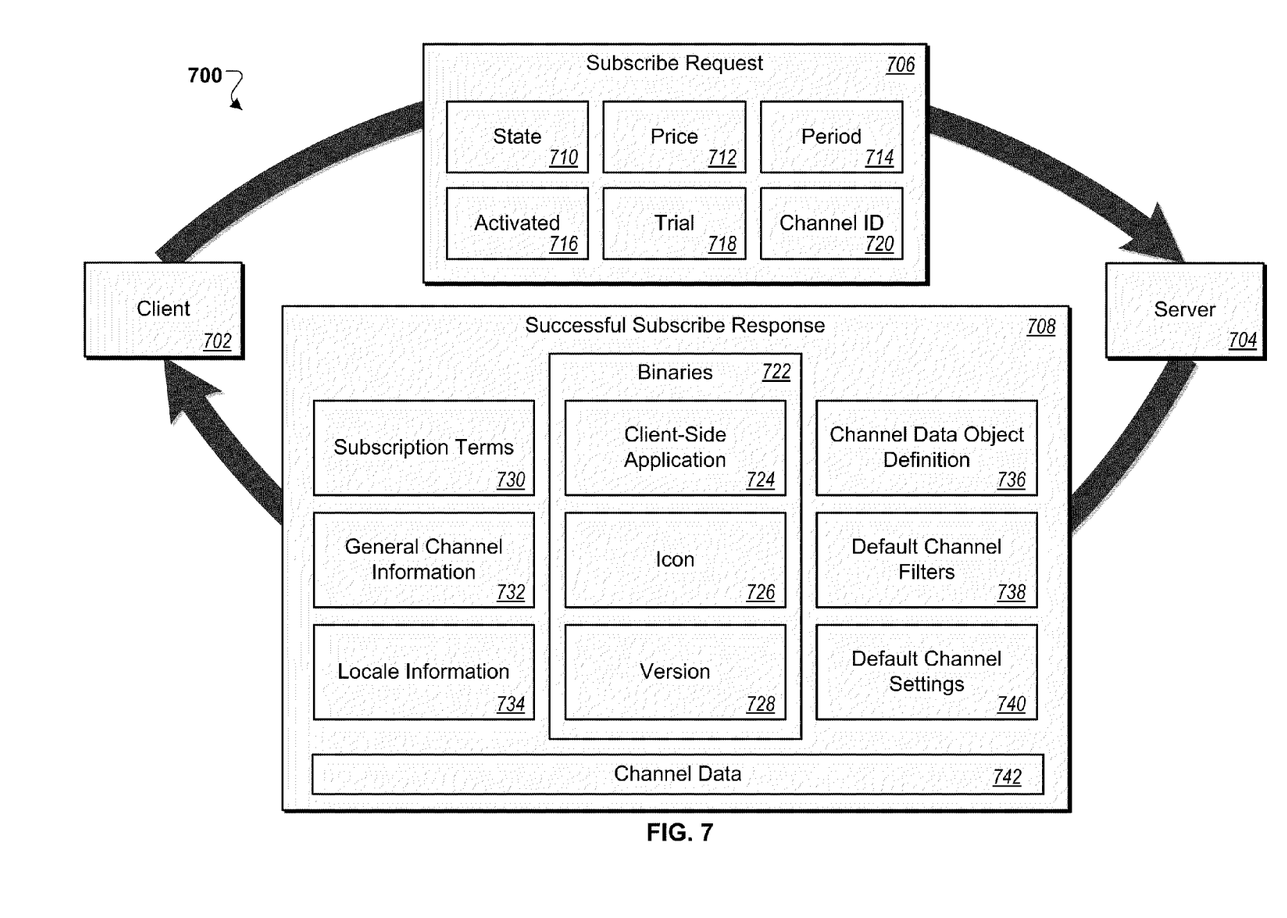
FIG. 7 is a diagram showing a request to subscribe and a response in accordance with some embodiments.

FIG. 7 is a diagram (700) showing a request to subscribe and a response in accordance with some embodiments. In general, as part of subscribing, a client can submit a request to subscribe to a server. If the user has the appropriate access rights and the request includes acceptable terms, the request can be successful. The server can respond with information including data and an application for rending the data.

A client (702) is an application hosted by an operating system on a connected device. The client (702) can implement client-specific aspects of a content-delivery protocol and thus be able to communicate effectively with other applications conforming to the protocol (e.g., the server (704)). The protocol can define the convention for communication between protocol implementations. For example, the protocol can define the syntax and composition of messages, and the appropriate responses to messages.

A server (704) is an application hosted on a computing platform that provides responses and content to clients (e.g., the client (702)). The server (704) can implement server-specific aspects of a content-delivery protocol and thus respond to client in a predictable way.

A subscribe request (706) is a request transmitted by a client (e.g., the client (702)) to a server (e.g., the server (704)). The subscribe request (706) can include details about the subscription requested. For example, the subscribe request (706) can indicate to which channel the user wants to subscribe and terms of the subscription. The subscribe request (706) can be an initial or confirmation request in a multi-step subscription process.

In specific, the subscribe request (706) can include properties such as a state (710), price (712), period (714), and channel identifier (ID) (720), as well as indications of whether a subscription is to be initially activated (716) or is a trial (718). The state (710) can indicate a condition or mode of the client (702). For example, the state (710) can indicate the client (702) is not subscribed, e.g., to particular content, but is requesting to subscribe. The state (710) also can indicate one or more actions taken by the client (702) (e.g., in response to communications received from the server (704)). The state (710) can be transitional indicating the client (702) made a change to the state and the change was not yet been acknowledged (e.g., by the server (704)). The state (710) can be indicated by a value, such as a word with special meaning. For example, the state (710) can be one of the values shown in TABLE 1.

TABLE 1

Client States

| State | Description |
|---|---|
| deliver | Indicates the client is requesting a channel (e.g., binaries and data associated with the channel) (transitional). |
| installed | Indicates the client has successfully installed a channel's binaries (transitional). |
| subscribed | Indicates the client is subscribed to the channel but is not receiving data updates (i.e., is deactivated). |
| activated | Indicates the client is subscribed to the channel and is receiving data updates. |
| unsubscribed | Indicates the client is not subscribed to the application. |

The price (712) can be a subscription price and a term used to determined whether a subscription will be successful (e.g., by the server (704)). For example, a price (712) that is lower than the current price of a subscription can result in a subscription being rejected. The price (712) can be a price indicated in a catalog feed maintained by the client (702). For a subscription to be successfully initiated, the client (702) can be required to include the price (712) in the subscribe request (706). Prices can be in a localized format (e.g., EUR2.00 or 2.50USD).

The period (714) can be the duration of a channel's subscription. The period (714) can be indicated in a catalog feed maintained by the client (702). The period (714) can be expressed using a unit of time, or period, indicator (e.g., for a day, week, month, or year) and an integer indicating the number of units of time included in the period (714) (e.g., "M3" for three months). The period indicator can be expressed as a letter as shown in TABLE 2.

TABLE 2

Period indicators.

| Period indicator | Meaning |
|---|---|
| D | Day |
| W | Week |
| M | Month |
| Q | Quarter |
| Y | Year |
| P | Perpetual (no number of units needed) |

The channel identifier (ID) (720) can uniquely identify a particular channel. The channel ID (720) can be indicated in a catalog feed maintained by the client (702). The channel ID (720) can be the only mechanism by which a channel is identified. Thus, a subscribe request (706) can require a channel ID (720) to be interpreted and to result in a subscription. The channel ID (720) can be, e.g., expressed as a number or a string of alphanumeric characters.

The indication of whether a subscription is to be initially activated (716) can specify whether the client (702) is to immediately begin receiving channel data updates relative to a subscription. For example, a client (702) can subscribe to a channel but not receive periodic updates. At a future point, the client (702) can request to receive updates having subscribed already. The activated indication (716) can be expressed as a Boolean value (e.g., "true" or "false"). "True" can indicate the client (702) is to begin receiving data updates upon subscribing and be the default value if a subscribe request does not include the activated indication (716). "False" can indicate the client (702) is to be subscribed to the channel but is not to receive any data updates.

The trial indication (718) can indicate whether a subscription is a normal or trial subscription. A trial subscription can be an introductory subscription. A trial subscription also can be a subscription of relatively short duration compared to a corresponding normal subscription (e.g., to the same channel) and allow a user to try and evaluate the subscription content. The trial indication (718) can be expressed as a Boolean value and default to a normal subscription indication if not included in the subscribe request (706).

A successful subscribe response (708) is a response transmitted by a server (e.g., the server (704)) to a client (e.g., the client (702)). The successful subscribe response (708) can include details about a subscription requested. For example, the successful subscribe response (708) can indicate whether a subscription was successful and include information allowing a user to benefit from the subscription requested (e.g., an application to render a channel's data). The successful subscribe response (708) can be an initial or confirmation response in a multi-step subscription process.

In specific, the successful subscribe response (708) can include subscription terms (730), general channel information (732), locale information (734), binaries (722), a channel data object definition (736), default channel filters (738), default channel settings (740), and channel data (742) (e.g., an initial data set). The subscription terms (730) can include details of a subscription agreement similar to the subscribe request (706). The subscription terms (730) can include a state, price (e.g., similar to the price (712)), period (e.g., similar to the period (714)), and a channel ID (e.g., similar to the channel ID (720)), and an indication whether the subscription will be initially activated (e.g., similar to the activated indication (716)) and whether the subscription is a trial (e.g., similar to the trial indication (718)). The state can indicate a condition or mode of the server (704). For example, the state can indicate the client (702) is not subscribed or that a subscribe request (706) was successful. The state also can indicate one or more actions taken by the server (704) (e.g., in response to communications received from the client (702)). The state can be transitional indicating the server (704) made a change to the state and the change was not yet been acknowledged (e.g., by the client (702)). The state can be indicated by a value, such as a word with special meaning. For example, the state included in the subscription terms (730) can be one of the values shown in TABLE 3.

TABLE 3

Server states

| State | Description |
|---|---|
| delivered | Indicates the server has delivered a channel (e.g., binaries and data associated with the channel) (transitional). |
| subscribed | Indicates a client is subscribed to a channel but is not receiving data updates (i.e., is deactivated). |
| activated | Indicates a client is subscribed to a channel and is receiving data updates. |
| unsubscribed | Indicates the client is not subscribed to the application. |

TABLE 3-continued

Server states

| State | Description |
|---|---|
| expired | Indicates a subscription period has expired (transitional). |
| cancelled | Indicates a subscription was either cancelled by a request from an external site via a server API, or administrator action (e.g., server administrator). |

The "expired" and "cancelled" states can be used to implement a two-step transition. For example, an event can occur at the server (704), such as an administrator's action (e.g., entering a command through an administration interface), a time-based event (e.g., a subscription expiring) or a method or function call (e.g., an API event). The event can instruct the server (704) to change the subscription state to "expired" or "cancelled." As a result of the expiration or cancellation, the server (704) can update the state stored with a user's subscription information. Communications from the server (704) to a client (702) can include the new subscription state. As a second step, the client (702) can remove the subscription, completing the transition.

The general channel information (732) can include public information pertaining to a given channel as a whole, rather than to an individual subscription held by the user. Each channel can have a set of general channel information (732). Each successful subscription response (706) can include general channel information (732) corresponding to the subscribed channel. In specific, the general channel information (732) can include properties corresponding to a channel's access permissions, a size of a channel, and other details about a channel.

A channel's permissions can be encoded in an access property of the general channel information (732). The access property can be a bit list encoded as a hexadecimal string. When decoded from the hexadecimal form, the string can be a binary sequence (e.g., "0100001") where each bit represents a permission flag. Each permission bit can have a predefined position. In some implementations, more than one bit can cause certain functionality to become accessible. In some implementations, a combination of access permissions can be needed to perform a high level operation. For example, granting permissions for "Read access to every channel's data", "Read access to my data" and "System level" can allow read access to the data of other channels. Similarly, revoking "Read access to my data" may not effectively revoke the permission if another granted permission includes the read permission. Further, in another example, playing video content can require both the "Network Video" and "Socket" permissions to be granted. The permissions used can be those supported by a commercial server application product such as Adobe Mobile Server provided by Adobe Systems Incorporated of San Jose, Calif.

The general channel information (732) can include a size of a channel (e.g., the storage space needed to install a channel's binaries). A client (702) can check the size before installing or subscribing to a channel (e.g., the client (702) can get the size from general channel information available in a catalog).

The general channel information (732) also can include other details about a channel. For example, the general channel information (732) can include a channel name, short and long descriptions, an indication whether the channel can be unsubscribed, a subscription type (e.g., free or premium), access privileges and extended access privileges, a channel's subscription period (e.g., similar to the period (714)), a price of a subscription (e.g., similar to the price (712)), and a content type.

Locale information (734) can include one or more localized resource items. For example, a channel can include a client-side application (724) as part of the binaries (722). In addition or instead, the channel also can include a client-side application localized to a specific language or region included in the locale information (734). Localized resource items can include items adapted to a dialect (e.g., United States and United Kingdom English) or culture, or translated to another language (e.g., French and German).

The binaries (722) can include a client-side application (724), an icon (726) and a version (728). The client-side application (724) can be used to interpret and display the channel's data (e.g., channel data (742)). The client side-application (724) can be, e.g., a binary object in the SWF format.

The icon (726) can be an icon image used to represent a channel. The binaries (722) can optionally include the icon (726). A client (702) can display the icon (726) to a user relative to information about a channel (e.g., the channel name).

The version (728) can be a version of the client-side application (724). A client (702) can use the version (728), e.g., to determine whether a client-side application (724) having the same version (728) has already been installed.

The channel data object definition (736) can define a channel's custom data objects. Default channel filters (738), if provided by a channel's publisher, can be used to extract the channel data object definition (736). One or both of the client (702) or the client-side application (724) can use the channel data object definition (736) to properly interpret a channel's data (e.g., the channel data (742)).

The default channel filters (738) can model a restrictive query on a channel's information (e.g., data and channel-specific commands). A filter can define a subset of the channel's information. On subscribing to a channel, default channel filters (738) can be provided. From a client (702), additional filters can be created indicating a user's preference for specific data (e.g., weather for a specific region).

Default channel settings (740) can be persistent name/value pairs that are stored relative to a channel. On subscribing to a channel, default channel settings (740) can be provided. In addition, settings can be created and modified after subscription. Settings can be stored on both the client (702) and the server (704) to help ensure the settings can be retrieved in various circumstances. For example, a client (702) can lose settings stored on a connected device in the event of a hard reset of the device. The server (704) can, in that case, provide the settings to the client (702).

The channel data (742) can be a channel's content or a portion of the content. For example, a channel dedicated to weather can include a client-side application (724) and channel data (742). The client-side application (724) can be used to render channel data (742) such as current temperature and forecast data.

In operation, a user can enter commands to subscribe to particular content on a connected device through a client (702) application. The client (702) can prepare and transmit a subscribe request (706) including details of the particular content selected by the user. As part of a subscription process, the server (704) can respond with a successful subscribe response (708) that prepares the client (702) for the subscription.

The connected device can include an application state (710) with the subscribe request (706). The state (710) can facilitate synchronization between the client (702) and the server (704). The state (710) also can enable the client (702) to appraise the server (704) of the client's (702) progress through a subscription process. Similarly, the server (704) can use a state included with the subscription information (730) to inform the client (702), e.g., whether a requested subscription was successful. During a subscription process, the server (704) can expect the client (702) to perform certain actions (e.g., installing channel binaries (722)). The server (704) can wait for the client (702) to indicate the actions were successfully performed before updating states. Advantageously, a user can thus avoid being billed for a subscription if problems occur during subscription preventing the user from enjoying the subscription.

If the subscribe request (706) includes a price (712), the price (712) can be compared to a repository of prices accessible to the server (704). If the price (712) is not the same, the subscription can fail. As a result, the server (704) can transmit an updated catalog to the client (702) including current subscription prices. The client (702) can then send a new request (706) with the correct price (712) to successfully subscribe.

If the subscribe request (706) includes a period (712), the period (712) can be compared to a repository of periods accessible to the server (704). If the period (712) is not the same, the subscription can fail. As a result, the server (704) can transmit an updated catalog to the client (702) including current subscription periods. The client (702) can then send a new request (706) with the correct period (712) to successfully subscribe.

Embodiments of the subject matter and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. Computer program instructions, which are thus encoded (e.g., as physically stored binary data), are a tangible article of manufacture that defines structural and functional interrelationships between the computer program and other components of a data processing apparatus, which permits the functionality to be realized.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Moreover, when functionality of one or more computer program products is realized through the data processing apparatus, the instructions transform physical aspects of the apparatus into a different state. For example, flip-flops, latches, transistor gates or capacitors included in a memory device can be transformed by the operation of the instructions to a different electronic state or level of electrical or magnetic charge.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows also can be performed by, and apparatus also can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a set-top box (STB), a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method performed by one or more computers programmed to provide content to connected devices, the method comprising:
    providing an application and consumable content rendered by the application to a connected device;
    obtaining confirmation the application and consumable content were received by the connected device and the application was successfully installed by the connected device; and
    establishing a content delivery relationship, including a billing relationship, in response to the obtained confirmation.

2. The method of claim 1, further comprising:
    receiving, from the connected device, a request, including one or more terms, to establish the content delivery relationship; and
    determining, based on the one or more terms, to provide the application and the consumable content to the connected device.

3. The method of claim 2, wherein the received one or more terms include a price term.

4. The method of claim 3, wherein determining comprises:
    comparing the price term to a corresponding stored price.

5. The method of claim 1, wherein the provided application comprises a binary SWF-format object.

6. The method of claim 1, wherein providing the consumable content comprises transmitting binary encoded data using hypertext transfer protocol.

7. The method of claim 1, wherein establishing the content delivery relationship comprises:
    periodically supplying one or more consumable content updates.

8. The method of claim 2, wherein establishing the content delivery relationship comprises:
    charging a user of the connected device based on the one or more terms.

9. A computer program product, tangibly encoded on a computer-readable medium, operable to cause data processing apparatus to perform operations comprising:
    providing an application and consumable content rendered by the application to a connected device;
    obtaining confirmation the application and consumable content were received by the connected device and the application was successfully installed by the connected device; and
    establishing a content delivery relationship, including a billing relationship, in response to the obtained confirmation.

10. The computer program product of claim 9, the operations further comprising:
    receiving, from the connected device, a request, including one or more terms, to establish the content delivery relationship; and
    determining, based on the one or more terms, to provide the application and the consumable content to the connected device.

11. The computer program product of claim 10, wherein the received one or more terms include a price term.

12. The computer program product of claim 11, wherein determining comprises:
    comparing the price term to a corresponding stored price.

13. The computer program product of claim 9, wherein the provided application comprises a binary SWF-format object.

14. The computer program product of claim 9, providing the consumable content comprises transmitting binary encoded data using hypertext transfer protocol.

15. The computer program product of claim 9, wherein establishing the content delivery relationship comprises:
    periodically supplying one or more data updates.

16. The computer program product of claim 10, wherein establishing the content delivery relationship comprises:
    charging a user of the connected device based on the one or more terms.

17. A system comprising:
    a connected device configured to operate as a client device; and
    a server device including one or more computers operable to interact with the connected device and to perform operations comprising:
    providing an application and consumable content rendered by the application to the connected device;

obtaining confirmation the application and consumable content were received by the connected device and the application was successfully installed by the connected device; and establishing a content delivery relationship, including a billing relationship, in response to the obtained confirmation.

18. The system of claim 17, the operations further comprising:

receiving, from the connected device, a request, including one or more terms, to establish the content delivery relationship; and determining, based on the one or more terms, to provide the application and the consumable content to the connected device.

19. The system of claim 18, wherein the received one or more terms include a price term.

20. The system of claim 19, wherein determining comprises:

comparing the price term to a corresponding stored price.

21. The system of claim 17, wherein the provided application comprises a binary SWF-format object.

22. The system of claim 17, providing the consumable content comprises transmitting binary encoded data using hypertext transfer protocol.

23. The system of claim 17, wherein establishing the content delivery relationship comprises:

periodically supplying one or more data updates.

24. The system of claim 18, wherein establishing the content delivery relationship comprises:

charging a user of the connected device based on the one or more terms.

25. A method comprising:

executing instructions on a computing platform so that an application and consumable content rendered by the application are provided to a connected device;

executing instructions on the computing platform so that a confirmation is obtained that the application and consumable content were received by the connected device and the application was successfully installed by the connected device; and executing instructions on the computing platform so that a content delivery relationship, including a billing relationship, is established in response to the obtained confirmation.

* * * * *